(12) United States Patent
Sdunnus et al.

(10) Patent No.: US 11,554,519 B2
(45) Date of Patent: Jan. 17, 2023

(54) METHOD FOR PRODUCING A THREE-DIMENSIONAL PREFORM FROM REINFORCING FIBERS

(71) Applicant: Airbus Operations GmbH, Hamburg (DE)

(72) Inventors: Thore Sdunnus, Hamburg (DE); Alexander Gillessen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 165 days.

(21) Appl. No.: 16/354,882

(22) Filed: Mar. 15, 2019

(65) Prior Publication Data
US 2019/0329456 A1 Oct. 31, 2019

(30) Foreign Application Priority Data
Apr. 26, 2018 (DE) .......................... 102018110123.6

(51) Int. Cl.
*B29B 11/12* (2006.01)
*B29B 11/16* (2006.01)
(Continued)

(52) U.S. Cl.
CPC .............. *B29B 11/12* (2013.01); *B29B 11/16* (2013.01); *B29C 70/342* (2013.01); *B29C 2043/3605* (2013.01)

(58) Field of Classification Search
CPC ....... B29B 11/12; B29B 11/16; B29C 70/342; B29C 70/12; B29C 70/40; B29C 70/36;
(Continued)

(56) References Cited

U.S. PATENT DOCUMENTS 3,165,432 A * 1/1965 Plaskett .................. B32B 27/00
156/244.21
4,943,222 A * 7/1990 Nathoo ..................... B28B 7/12
425/395
(Continued)

FOREIGN PATENT DOCUMENTS

DE 102008001498 B3 8/2009
DE 102008028865 A1 12/2009
(Continued)

OTHER PUBLICATIONS

German Search Report; priority document.
European Search Report for corresponding European U.S. Appl. No. 19/160,702 dated Sep. 13, 2019.

*Primary Examiner* — Joseph S Del Sole
*Assistant Examiner* — Margaret B Hayes
(74) *Attorney, Agent, or Firm* — Greer, Burns & Crain, Ltd.

(57) ABSTRACT

A method for producing a three-dimensional preform from reinforcing fibers for producing a component from a fiber-reinforced plastic comprises the steps of introducing at least one layer of fibers having a binder into a draping mold, forming the at least one layer of fibers by at least one forming element which is displaceable along the draping mold, applying an airtight film to the at least one layer of fibers during or directly after the forming, creating a negative pressure in the intermediate space between the airtight film and the draping mold, activating the binder and removing the negative pressure after curing of the binder.

9 Claims, 2 Drawing Sheets

(51) Int. Cl.
*B29C 70/34* (2006.01)
*B29C 43/36* (2006.01)

(58) Field of Classification Search
CPC .............. B29C 70/46; B29C 70/528; B29C 2043/3605; B29C 43/18; B29C 43/52; B29C 35/02; B29C 45/26; B29C 45/2606; B29C 45/17; B29C 43/04; B29C 43/206; B29C 43/26; B29C 43/265; B29C 43/28
See application file for complete search history.

(56) References Cited

U.S. PATENT DOCUMENTS

| | | | | |
|---|---|---|---|---|
| 7,090,794 | B2* | 8/2006 | Pedersen | D04H 1/4226 264/118 |
| 8,943,664 | B2* | 2/2015 | Miguez Charines | B29C 70/342 29/458 |
| 9,096,021 | B2 | 8/2015 | Sander et al. | |
| 9,789,673 | B2 | 10/2017 | Brufau Redondo et al. | |
| 2010/0080952 | A1* | 4/2010 | Suzuki | B29C 43/30 428/113 |
| 2012/0061006 | A1 | 3/2012 | Marquardt | |
| 2014/0290866 | A1* | 10/2014 | Brufau Redondo | B29C 70/386 156/535 |
| 2016/0101543 | A1* | 4/2016 | Fisher, Jr. | B29C 66/524 428/688 |
| 2016/0361837 | A1* | 12/2016 | Hayes | B29C 43/183 |
| 2018/0127192 | A1* | 5/2018 | Cohen | B65D 31/12 |
| 2019/0283343 | A1* | 9/2019 | Hirabayashi | B29C 53/18 |

FOREIGN PATENT DOCUMENTS

| | | |
|---|---|---|
| DE | 102015100102 A1 | 7/2016 |
| DE | 102016117178 A1 | 3/2018 |
| WO | 2013064187 A1 | 5/2013 |

* cited by examiner

METHOD FOR PRODUCING A THREE-DIMENSIONAL PREFORM FROM REINFORCING FIBERS

CROSS-REFERENCES TO RELATED APPLICATIONS

This application claims the benefit of the German patent application No. 10 2018 110 123.6 filed on Apr. 26, 2018, the entire disclosures of which are incorporated herein by way of reference.

FIELD OF THE INVENTION

The invention relates to a method for producing a three-dimensional preform from reinforcing fibers for producing a component from a fiber-reinforced plastic. The invention also relates to an apparatus for producing a three-dimensional preform from reinforcing fibers.

BACKGROUND OF THE INVENTION

In airliners and other vehicles, components of fiber-reinforced plastics are often used to reduce weight. These could, for instance, consist of carbon fibers that are embedded in a matrix material and cured. There are known methods in which preformed semifinished fiber products are impregnated with a matrix material, the impregnation being performed, for example, by a vacuum infusion process. For this purpose, it is required that the fiber-based preforms are already in the desired product form and have a certain intrinsic stability.

While a vacuum infusion process has certain advantages for the industrial production of components from fiber-reinforced plastics, the industrial-scale fabrication of more complexly shaped, three-dimensional preforms using in particular nonwoven fibrous sheets can be difficult. There are no methods at present for producing preforms for stiffening components or similar elements that have a T-shaped profile cross section in a continuous forming process.

DE 10 2008 028 865 A1 shows for instance a method for producing a preform which can be curved or twisted in a way corresponding to a desired curvature and/or torsion of the profile component to be produced, the method comprising the introduction of mold core parts and the fibers that are used being embedded in prepregs.

SUMMARY OF THE INVENTION

An object of the invention is consequently that of proposing a method for producing a three-dimensional preform from reinforcing fibers which, even when using nonwoven reinforcing fibrous sheets, can be carried out in a manner that can be automated as well as possible and which also allows a more complex three-dimensional structure of the preform.

A method for producing a three-dimensional preform from reinforcing fibers for producing a component from a fiber-reinforced plastic is proposed, the method comprising the steps of introducing at least one layer of fibers having a binder into a draping mold, forming the at least one layer of fibers by at least one forming element, which is displaceable along the draping mold, applying an airtight film to the at least one layer of fibers during or directly after the forming, creating a negative pressure in the intermediate space between the airtight film and the draping mold, activating the binder and removing the negative pressure after curing of the binder.

A draping mold is a device also known as a die that has at least one supporting surface on which reinforcing fibers can be laid. The supporting surface of the draping mold in this case determines the later surface of the preform produced. In the context of the invention, the draping mold may have a complex geometrical shape, which consequently also allows more complexly shaped preforms. As stated further below, structural components with an at least partially T-shaped cross section can be produced, in particular, with this draping mold.

To improve the detachment of a preform, the supporting surface may have a smooth surface, to which a release layer can also be applied. Furthermore, the supporting surface may have an area extent that exceeds the extent of the preform to be produced. On the one hand, this allows better handling of a film that can be applied to the preform, on the other hand, the at least one forming element can likewise similarly have a greater dimension than the preform to be produced and unevenly formed locations at the periphery of the preform can be avoided. Furthermore, this allows there to be a peripheral strip, which can be provided with a separate seal that can be used for sealing the film on the supporting surface.

The at least one layer of fibers that is applied to the draping mold has a binder. The binder could be, in particular, a thermoplastic material which surrounds the individual reinforcing fibers. By heating the layer of fibers, the binder can be melted, in order, after renewed cooling, to remain in the shape produced by forming. The reinforcing fibers embedded in the binder have a comparatively low dimensional stability, which makes the forming possible.

It would also be possible to use thermosetting binders. These could be pre-crosslinked by heat treatment, so that in this way a sufficient dimensional stability is ensured, which ensures the retention of the shape of the fibers.

For the forming of the at least one layer of fibers, the at least one forming element is displaced along the draping mold. The reinforcing fibers are thereby bent mechanically into their desired shape in the desired way while in surface-area contact with the forming element. It goes without saying that, depending on the complexity of the preform to be produced, a plurality of forming elements could also be used. These could be displaceable along the draping mold, one after the other, as a chain of forming elements. Depending on the configuration of the draping mold, it may have different contact surfaces, types of construction, sizes, in particular widths, different provided compressive forces and the like. The aim is to arrange and orient the reinforcing fibers in such a way that the desired local thicknesses are achieved and a precise adaptation to the draping mold is allowed.

An essential step is the application of an airtight film to the at least one layer of fibers, during or directly after the forming, and also the creation of a negative pressure in the intermediate space between the airtight film and the draping mold. As a result, the at least one layer of fibers that has undergone the forming operation is kept in its intended shape, in that the ambient pressure acts on the film and consequently the film prevents elastic recovery of the reinforcing fibers.

After the fixing of the composite of reinforcing fibers on the draping mold, the binder can be activated, so that, after the subsequent curing of the binder, all of the reinforcing fibers retain their adopted shape. The activation could comprise, for instance, the heating of the composite of reinforcing fibers, so that a thermoplastic binder melts and, after cooling of the composite, hardens in this position.

Altogether, the method according to the invention can provide a highly automatable, efficient possible way of producing, on an industrial scale, three-dimensional preforms from reinforcing fibers, in particular, complexly shaped preforms on nonwoven fibers.

In a particularly preferred embodiment, the at least one layer of fibers is provided as a fibrous sheet. A fibrous sheet refers to a two-dimensional formation of reinforcing fibers that are not crimped or curly. A fibrous sheet is preferably provided with fiber bundles running parallel to one another, it also being possible for individual bundles or strands to be knitted together to increase the ease of handling of such fibrous sheets for being introduced into the draping mold.

The invention is not restricted to the use of fibrous sheets, in that woven fiber fabrics can also be used. Fiber fabrics differ from fibrous sheets by the woven structure of fiber bundles, so that woven fabrics inevitably have reinforcing fibers in at least two different orientations.

In an advantageous embodiment, a number of suction connections are distributed on the draping mold and the creation of the negative pressure comprises selectively applying the negative pressure to individual suction connections or groups of suction connections. In particular, in the case of relatively large preforms to be produced, it is recommendable to be able to selectively evacuate different regions locally. The necessary extracting power and the generation of noise when carrying out the method can thereby be optimized. The selective evacuation could comprise both selective evacuation along the displacing movement of the at least one forming element and in a direction transverse to the displacing movement. For the isolated application of negative pressure to individual suction connections or individual groups of suction connections, it may be envisaged to cover individual suction connections by a selectively removable covering. This could be performed by one or more film strips, which are removed from the suction connections at the portions to be evacuated.

In a particularly advantageous embodiment, a number of suction connections are distributed on the draping mold and the creation of the negative pressure comprises successively applying the negative pressure to individual suction connections or groups of suction connections underneath a region that has undergone the forming operation. If a certain path along the draping mold is always traversed during the forming, the reinforcing fibers that are ahead of the at least one forming element being not yet deformed and the reinforcing fibers that are behind the at least one forming element being already deformed, the corrective adjustment of the application of negative pressure to the suction connections may be appropriate. The regions that have already undergone the forming operation can consequently be directly fixed by the negative pressure acting, in order to activate and cure the binder later or at the same time. Here, too, it could be appropriate to use one or more airtight film strips which close the individual suction connections and are removed from local suction connections directly during the traversing movement of the at least one forming element.

The at least one forming element may comprise a roller, which is rolled along at least one forming zone on the at least one layer of fibers. Consequently, a uniform shape of the preform that is repeated along the path of displacement is realized. A roller does not necessarily have to have a constant diameter along its axis of rotation. Rather, profiles and graduations are also conceivable, depending on requirements. Furthermore, it is conceivable to use a number of rollers one behind the other, which have, for example, different widths, diameters and the like, and are displaced along different regions along the draping mold. A roller may be of both a rigid and an elastic configuration. The circumferential surface of the roller may be so compliant that depressions and protuberances in the draping mold can be easily allowed for by the roller. For example, the roller may include a compliant outer layer in the manner of foam rubber or a similar material.

Furthermore, the at least one forming element may comprise at least one shaping element, which is moved with a pressing surface sliding on the at least one layer of fibers. The pressing surface has the particular advantage that a more complex shaping can be created in comparison with a roller. In special cases, it may, for instance, be necessary to spread out reinforcing fibers along the path of displacement of the at least one forming element transversely to the path of displacement and press them onto the draping mold. The pressing surface could, for this purpose, have a narrow run-in region, which is directed towards the region of reinforcing fibers that has not undergone forming, and a wider run-out region, which is followed by the reinforcing fibers that have been deformed. A pressing surface could therefore be shaped in a manner similar to the hull of a ship or a plough, which leads to a distinctly laterally directed deformation, which is difficult to carry out with a roller. It goes without saying that rollers and shaping elements that complement one another may also be provided.

The at least one forming element may also be resiliently or flexibly suspended. As a result, the overrunning of more complex shapes with pronounced elevations and depressions, while gently pressing fibers onto the draping surface, can be further assisted.

It is additionally conceivable to move the at least one forming element also in relation to the advancing device, for example by tilting, tipping, turning, twisting, laterally or vertically displacing or the like. As a result, the flexibility for overcoming possible structures of the draping mold is improved still further.

Particularly advantageously, the application of the airtight film comprises unrolling the film and positioning the unrolled film on the preform with the aid of a deflecting roll. The deflecting roll may be positioned just above the preform or in such a way that it can at the same time also be used as a roller for the forming operation. The deflecting roll should, in particular, only apply the film after all the further deflecting elements have been passed through.

Preferably, the deflecting roll completes the forming of the at least one layer of fibers. Depending on the shape of the supporting surface, peripheral regions or the entire assembly of reinforcing fibers could, for example, be overrun by the deflecting roll, so that the film is applied directly after the forming or rolling operation.

It is pointed out here that, directly after the application of the film, local application of the negative pressure may take place, as explained above.

In particular, for the production of preforms with a profile cross section that is of a T-shaped form at least in portions, it may be appropriate that the draping mold is subdivided into two halves, which are movable in relation to one another to form a gap, the introduction of the at least one layer of fibers comprising the opening of the gap to a first gap size, the introduction of the at least one layer of fibers into the gap between the two halves of the draping mold and the reducing of the gap size to a second gap size, which determines the thickness of a web of the preform. The draping mold may be subdivided into two halves along the entire path of displacement or only in certain portions, depending on the specific configuration of the preform to be produced. If the two halves of the draping mold are brought to a distance from one another to form a gap, the at least one layer of fibers can be introduced into this gap, in order then to reduce the gap to a predetermined size, which determines the later thickness of the web of the preform. After that, one or more forming elements may be moved over the draping mold, so that the reinforcing fibers protruding out of the gap are formed, in particular laterally, i.e., transversely to the displacing movement. A T-shaped reinforcing profile can easily be created from this.

The subdivision may be used for storing the preform after its completion. The film may remain on the preform and the preform may remain the two halves of the draping mold. These could be removed from the corresponding apparatus and temporarily stored at a different location. The remaining film and the laterally arranged halves of the draping mold allow very good protection from mechanical damage and from soiling to be accomplished.

Moreover, the halves of the draping mold can also be used as a positioning aid. Consequently, by way of example, preforms for T stringers could be positioned on a dry wing skin. Furthermore, the halves could also be used as thrust pieces. For example, these thrust pieces could be used for T stringer preforms, for the joint infusion and curing of the T stringer preforms and the wing skin.

The activation of the binder may comprise heating the draping mold, the binder being a thermoplastic. The heating of the draping mold, for example by means of an electrical resistance heater, allows the binder of at least one layer of fibers to be heated uniformly. It could be appropriate to provide the draping mold with temperature sensors in the vicinity of the supporting surface, so that optimum temperature control and monitoring can be performed. In particular, in the case of this variant it would have to be ensured that a melting temperature of the binder is reliably reached or exceeded and that, by evaluating a temperature profile, the solidifying of the binder can be detected.

The method may additionally comprise the maintaining of a predetermined temperature for a predetermined first period of time, so that the binder melts completely, and additionally the cooling of the draping mold with the created negative pressure for a predetermined second period of time. By setting the predetermined periods of time, it can be ensured, depending on the thickness of the at least one layer of fibers, that the binder reliably melts over the entire thickness of the preform and subsequently also cures again over the entire thickness of the preform. The corresponding periods of time could be determined experimentally and, for example, be provided with an additional safety factor.

The invention also relates to an apparatus for producing a three-dimensional preform from reinforcing fibers for producing a component from a fiber-reinforced plastic, comprising a draping mold, at least one forming element, at least one advancing device, an airtight film, a negative pressure device and an activating device, the draping mold having a receiving surface for receiving at least one layer of reinforcing fibers having a binder, the at least one forming element being coupled to the at least one advancing device in order to displace the at least one forming element along the draping mold, the negative pressure device being pneumatically couplable with an intermediate space between the receiving surface and the film into which the reinforcing fibers can be brought in order to keep reinforcing fibers in their formed shape, and the activating device being designed to activate a binder that is in the reinforcing fibers. This apparatus can carry out the method according to the invention described above.

As likewise mentioned above, the activating device may be a heating device. This is arranged for instance in the draping mold. For optimum heat conduction, it may be appropriate to produce the draping mold at least partially from a metallic material, so that the heating power is optimized by ensuring a good thermal conductivity between the heating device and a supporting surface.

As likewise mentioned above, the draping mold may be subdivided into two halves, which are movable in relation to one another to form a variably opened gap with at least a first gap size and a second gap size, in order to introduce at least one layer of fibers into the gap.

Heating may also be performed by a kind of temperature control carriage, which is arranged on the apparatus and is displaceable with the advancing device. It may also be appropriate for the method to move a heating device, for example in the form of a temperature control carriage, along on the draping mold directly at the regions as soon as the film has been applied and the vacuum has been created. Consequently, the production can be performed in a closed, continuous process.

BRIEF DESCRIPTION OF THE DRAWINGS

Further features, advantages and application possibilities of the present invention emerge from the following description of the exemplary embodiments and the figures. In these, all of the features described and/or graphically presented form by themselves and in any desired combination the subject matter of the invention, even independently of how they are grouped together in the individual claims or the way in which the claims refer back to one another. Furthermore, in the figures the same designations stand for objects that are the same or similar.

DETAILED DESCRIPTION OF THE PREFERRED EMBODIMENTS

Figure 1:
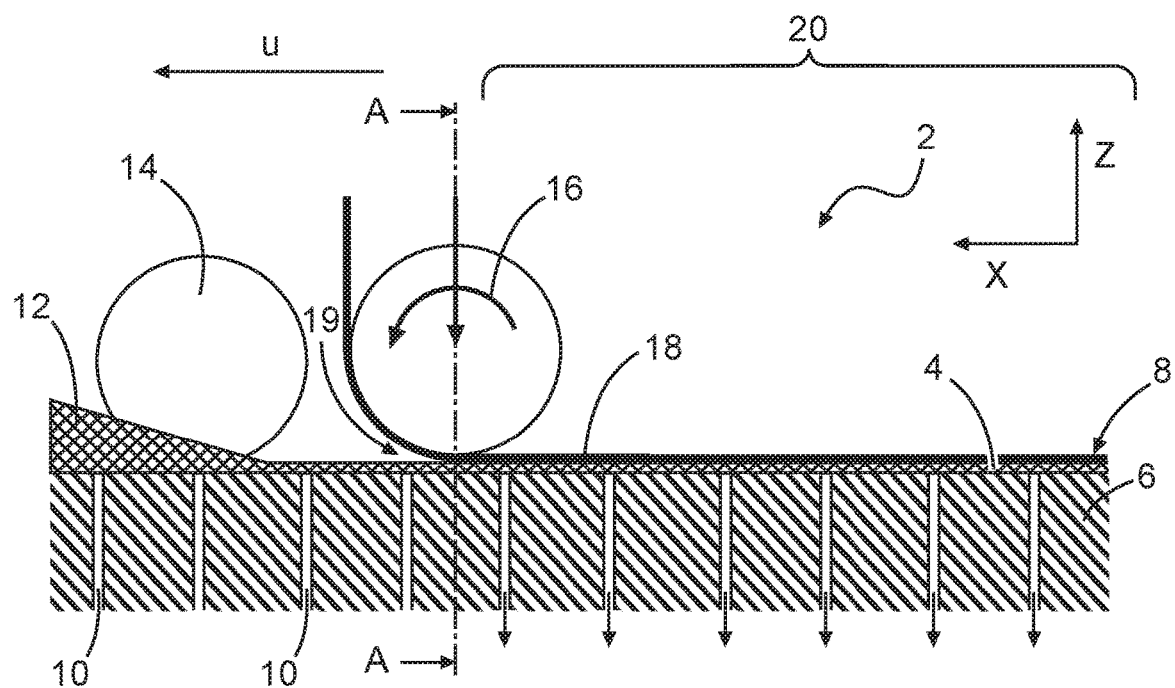
FIG. 1 shows an apparatus according to the invention, on which the method according to the invention is carried out, in a longitudinal section.

FIG. 1 shows an apparatus 2 for producing a three-dimensional preform 4 from reinforcing fibers, a method for producing a three-dimensional preform 4 that has been explained above and is represented in FIG. 3 being carried out with the apparatus 2. A draping mold 6, which has a supporting surface 8, is shown. A number of suction connections 10 are distributed in the draping mold 6 and can establish a fluid connection between a negative pressure device (not shown) and the supporting surface 8. Since FIG. 1 contains a schematic representation, a very simple geometrical form of the draping mold 6 has been chosen. However, much more complex shapes are similarly possible.

A layer of fibers 12 comprising reinforcing fibers that are uncrimped, straight and run parallel to one another ("non-crimp fabric," NCF) has been applied to the supporting surface 8 and is initially still without a specific shape (left side in the plane of the drawing). By at least one forming element 14, which by way of example is configured here as a roller, the preform 4 can be formed from the reinforcing fibers 12 that have not yet undergone the forming operation. For this purpose, the at least one forming element 14 is moved along a forming zone u.

By means of at least one deflecting roll 16, an airtight film 18, which originates from a film reservoir not represented, is applied to the region 20 that has already undergone the forming operation. The deflecting roll 16 can press onto the at least one layer of fibers 12 in order to complete the forming operation. Alternatively, a certain distance from the layer of fibers 12 may also be adopted, so that the deflecting roll 16 no longer mechanically influences the shape already produced. The subsequent creation of a negative pressure at the suction connections 10 of the region 20 that has undergone the forming operation, and consequently in an intermediate space 19 between the draping mold 6 and the film 18, has the effect that the film 18 is pressed onto the region 20 that has undergone the forming operation, so that it retains its shape.

Figure 2:
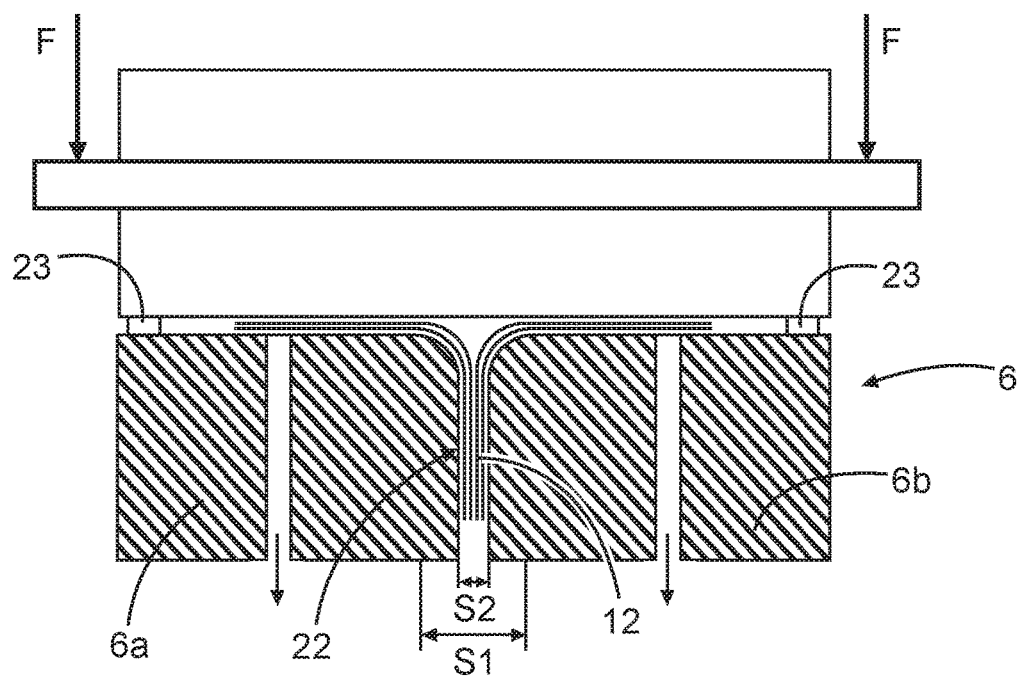
FIG. 2 shows a sectional representation of the apparatus in a cross section.

FIG. 2 shows a section through the deflecting roll 16 and the draping mold 6. Here it can be seen that the draping mold 6 is subdivided into two halves 6a and 6b, which can adopt a variable distance from one another. In the representation shown in FIG. 2, the two halves 6a and 6b are in a position that corresponds to a second gap size. This is denoted in FIG. 2 by S2. In the case of the second gap size S2, the reinforcing fibers 12 have already been pressed together in such a way that the later thickness of a web 22 is determined. For introducing reinforcing fibers 12 that have not undergone the forming operation, the two halves 6a and 6b can be brought into another position, which corresponds to a first gap size S1. Here, the distance between the two halves 6a and 6b is somewhat greater, so that the reinforcing fibers 12 can be inserted very easily. In FIG. 2, the reinforcing fibers 12 have already completely undergone the forming operation, i.e., a T-shaped profile cross section is formed. Sealing strips 23, which assist the sealing provided by the film 18 on the supporting surface 8, may be arranged at peripheral regions of the draping mold 6.

Figure 3:
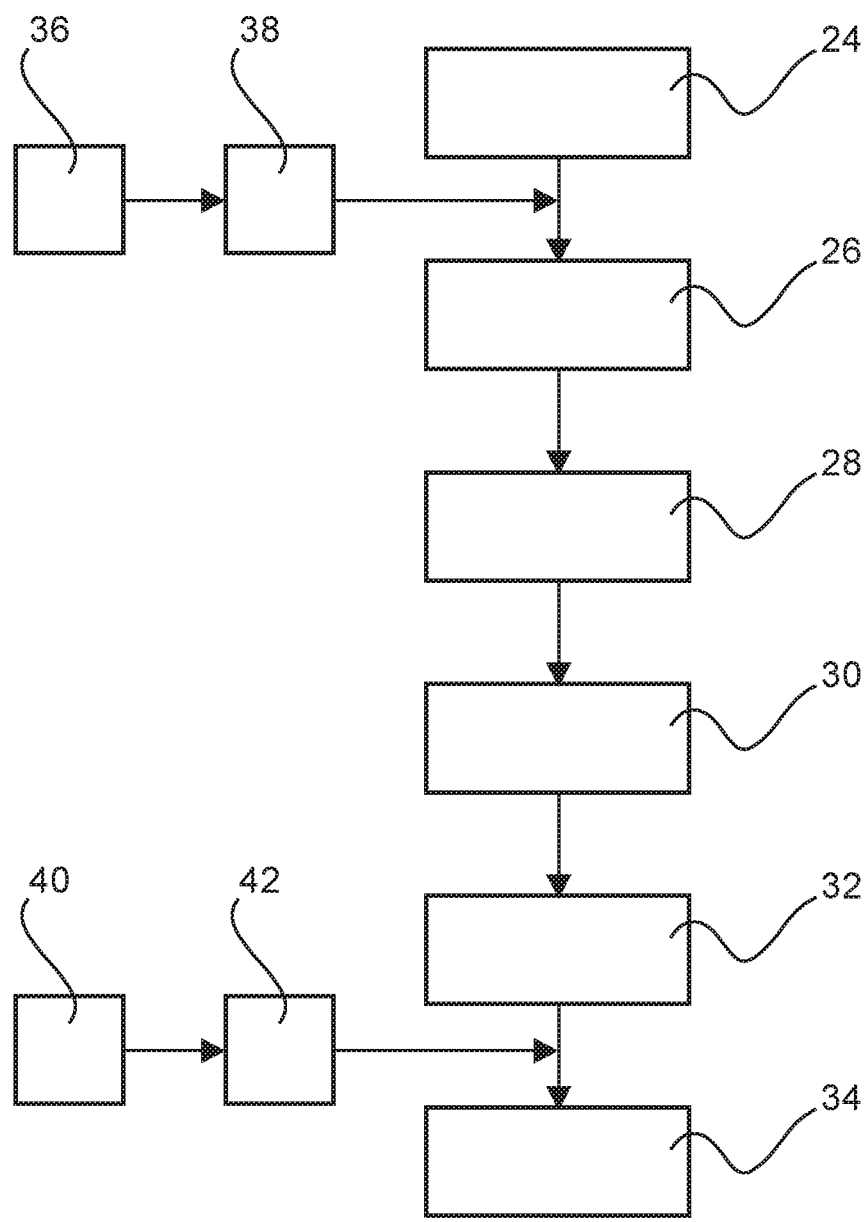
FIG. 3 shows a flow diagram of the method according to the invention.

Finally, FIG. 3 shows a block-based representation of the method according to the invention. The method begins with the introduction 24 of at least one layer of fibers 12 having a binder into a draping mold 6, which is followed by the forming 26 of the at least one layer of fibers 12 by at least one forming element 14, which is displaceable along the draping mold 6. After that, an airtight film 18 is applied 28 to the at least one layer of fibers 12 during or directly after the forming 26 and a negative pressure is created 30 in the intermediate space between the airtight film 18 and the draping mold 6. This is followed by the activation 32 of the binder, for instance in the form of heating, and subsequently the removal 34 of the negative pressure after curing of the binder. The introduction 24 of the at least one layer of fibers 12 having a binder may comprise the opening 36 of a gap between two halves 6a and 6b of the draping mold 6 and also the reducing 38 of the gap size to a second gap size. Before the removal of the negative pressure, a predetermined temperature may be maintained 40 for a predetermined first period of time T1, so that the binder melts completely, and in addition may comprise the cooling 42 of the draping mold 6 with the created negative pressure for a predetermined second period of time T2.

It should additionally be pointed out that "having/comprising" does not exclude other elements or steps and "a" or "an" does not exclude more than one. Furthermore, it should be pointed out that features that have been described with reference to one of the above exemplary embodiments can also be used in combination with other features of other exemplary embodiments described above. Designations in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a three-dimensional preform from reinforcing fibers for producing a component from a fiber-reinforced plastic, comprising the steps of:
   introducing at least one layer of fibers having a binder onto a supporting surface of a draping mold, wherein the draping mold is subdivided into two halves, which are movable in relation to one another to form a gap, the two halves each supporting a bottom surface of the at least one layer of fibers,
   opening the gap, in a first direction, to a first gap size so that at least a portion of the at least one layer of fibers is disposed within the gap between the two halves of the draping mold,
   reducing the first gap size, in a second direction opposite the first direction, to a second gap size which determines a thickness of a web of the three-dimensional preform,
   forming the at least one layer of fibers with at least one forming element by displacing the at least one forming element along the draping mold in a third direction parallel with a longitudinal axis of the at least one layer of fibers, the third direction orthogonal to the first direction,
   applying an airtight film to the at least one layer of fibers during or directly after the forming,
   creating a negative pressure in an intermediate space between the airtight film and the draping mold via a suction connection extending through the draping mold to the supporting surface,
   activating the binder, and
   removing the negative pressure after curing of the binder,
   wherein a plurality of suction connections are distributed on one side of the draping mold, and
   wherein the step of creating the negative pressure comprises selectively applying the negative pressure to an individual suction connection or a group of suction connections on the one side of the draping mold, wherein the group of suction connections has less than all of the suction connections in the plurality of suction connections.

2. The method according to claim 1, wherein the at least one layer of fibers is provided as a fibrous sheet.

3. The method according to claim 1, wherein the step of creating the negative pressure further comprises successively applying the negative pressure to the individual suction connections or the group of suction connections one the one side of the draping mold underneath a region that has already undergone the forming step.

4. The method according to claim 1, wherein the at least one forming element comprises a roller, which is rolled along at least one forming zone on the at least one layer of fibers.

5. The method according to claim 1, wherein the at least one forming element comprises at least one shaping element, which is moved with a pressing surface sliding on the at least one layer of fibers.

6. The method according to claim 1, wherein the step of applying the airtight film comprises unrolling the film and positioning unrolled film on the preform via a deflecting roll.

7. The method according to claim 6, wherein the deflecting roll completes the forming of the at least one layer of fibers.

8. The method according to claim 1, wherein the step of activating the binder comprises heating the draping mold, the binder being a thermoplastic.

9. The method according to claim 8, wherein
the method additionally comprising maintaining a predetermined temperature for a predetermined first period of time, so that the binder melts completely, and
the method additionally comprises a cooling of the draping mold with the created negative pressure for a predetermined second period of time.

* * * * *